United States Patent [19]

Ditscheid

[11] Patent Number: 4,555,227
[45] Date of Patent: Nov. 26, 1985

[54] DEVICE FOR INJECTION MOULDING INSULATING DISKS ONTO THE INNER CONDUCTOR OF HIGH-FREQUENCY COAXIAL CABLES

[75] Inventor: Hans L. Ditscheid, Bergisch Gladbach, Fed. Rep. of Germany

[73] Assignee: U.S. Philips Corporation, New York, N.Y.

[21] Appl. No.: 628,013

[22] Filed: Jul. 5, 1984

[30] Foreign Application Priority Data

Jul. 6, 1983 [DE] Fed. Rep. of Germany ....... 3324348

[51] Int. Cl.⁴ .............................................. B29D 23/05
[52] U.S. Cl. ................................ 425/122; 425/129 R; 425/576; 425/588
[58] Field of Search ................ 425/542, 545, 576, 115, 425/117, 121, 122, 129 R, 588

[56] References Cited

U.S. PATENT DOCUMENTS

| | | | |
|---|---|---|---|
| 2,288,899 | 7/1942 | Gits | 425/121 X |
| 2,534,678 | 12/1950 | Obermann et al. | 425/121 |
| 3,196,196 | 7/1965 | Burbank | 425/122 X |
| 3,849,042 | 11/1974 | Anderegg | 425/122 X |
| 3,873,257 | 3/1975 | Vanotti | 425/122 X |
| 3,999,914 | 12/1976 | Breher et al. | 425/122 X |

Primary Examiner—Robert Lindsay
Attorney, Agent, or Firm—Norman N. Spain

[57] ABSTRACT

The invention relates to a device for injection moulding insulating disks onto the inner conductor of high-frequency coaxial cables comprising a cylindrical tool carrier which is rotatable about its axis and at whose circumference are located radially arranged forming nests for forming the insulating disks and which are provided with moulding ducts extending radially outwards, wherein the forming nests, through the centers of which passes the inner conductor, can be opened and closed. The injection nozzle of the device takes the form of a slot, the longitudinal direction of the slot extending in the circumferential direction of the tool carrier and the longitudinal dimension of the slot being larger than the diameter of the moulding ducts. The film of moulding material formed on the surface of the tool carrier and interconnecting the individual insulating disks is torn off the insulating disks by means of a suitable separating member at an area of the tool carrier at which the forming nests are still closed.

6 Claims, 3 Drawing Figures

DEVICE FOR INJECTION MOULDING INSULATING DISKS ONTO THE INNER CONDUCTOR OF HIGH-FREQUENCY COAXIAL CABLES

BACKGROUND OF THE INVENTION

The invention relates to a device for injection moulding insulating disks onto the inner conductor of high-frequency coaxial cables comprising a turret which is rotatable about its axis and at whose circumference are located mold cavities which are radially arranged and which are provided with radially outwards extending moulding ducts for forming the insulating disks, wherein the mold cavities, through the centers of which the inner conductor passes, can be opened and closed, said device further comprising a system for feeding the moulding material to the mold cavities and comprising an injection nozzle which, injection nozzle is directed towards the outer surface of the turret, and a separation member for separating the strip of moulding material, formed during moulding on the circumference of the turret, from the insulating disks.

Such a device is known already from U.S. Pat. No. 4,133,622 the contents of which are hereby incorporated by reference. In the method of this patent inner conductor provided with the insulating disks leaves the turret in stretched condition, while the individual insulating disks are still interconnected by the strip of moulding material formed during injection moulding on the outer surface. Due to the fact that the strip of moulding material is formed at a radius which is larger than that along which the inner conductor extends, dislocations of the strip of moulding material occur after stretching of the inner conductor because of the excess length of this strip so that the insulating disks are displaced from their desired position by unilaterally applied shearing and bending forces of different values and are detached.

This effect, which has a considerable unfavourable influence on the high-frequency cable is the more strongly pronounced as the insulating disks are cured to a lesser extent. Since in the known device, the size of the injection nozzle opening substantially corresponds to the diameter of the moulding ducts, the moulded insulating disks cannot be compressed within the required hold-on pressure time, especially at high manufacturing speeds, so that they are cured only incompletely or do not enclose the inner conductor to the required extent and thus are loosened more readily upon application of external forces.

At higher manufacturing speeds, there is the disadvantage that the insulating disks, before they leave the turret, cannot be cooled sufficiently rapidly so that their adherence to the inner conductor is further reduced. Moreover, at higher speeds there is a risk that the cavities for forming the insulating disks are filled only incompletely with moulding material because the extruder screw makes available the moulding material, which is substantially not compressible, in the quantity which is required between two moulding ducts as a moulding material strip, and during the comparatively short time in which the injection nozzle and sprue overlap each other, only a part of the moulding mass is allowed to enter the mold cavities because otherwise the strip of moulding material serving as a lubricating film would be interrupted. In the absence of a sufficient moulding pressure, also in this case no fixed seat of the isolating disks on the inner conductor will be possible.

SUMMARY OF THE INVENTION

The invention has for its object to provide a device by means of which insulating disks can be applied to an inner conductor of a high-frequency cable with a stability which is improved as compared with the prior art and at an increased manufacturing speed.

According to the invention this object is achieved by means of a novel molding device wherein the injection nozzle is in the form of a slot and the longitudinal direction of which slot extends in the circumferential direction of the turret, in that the longitudinal dimension of the slot is larger than the diameter of the moulding ducts and in that the separating member is arranged relative to the tool carrier so that it separates the film of moulding material from the insulating disks in an area of the tool carrier in which the mold cavities are still closed.

Due to the use of this slot-shaped nozzle, it is achieved that even at high manufacturing speeds the required time for completely filling the forming nests with moulding material and moreover the hold-on pressure time required for curing the insulating disks can be adjusted so that perfect insulating disks fixedly arranged on the inner conductor can be obtained. The arrangement in accordance with the invention of the separating member moreover prevents that the insulating disks thus obtained, after having left the turret, as according to the prior art, are detached again because with closed mold cavities, the insulating disks are fixedly positioned relative to the inner conductor.

The increased manufacturing speed of the device according to the invention moreover permits of combining this device with other manufacturing stages effected more rapidly for obtaining a high-frequency coaxial cable so that the efficiency of the said process of manufacturing cables as compared with a manufacturing process comprising separate processing steps is increased.

According to an advantageous embodiment of the invention, the end face of the injection nozzle is provided with a recess in such a manner that the spreading of the film of moulding material in the direction of movement of the turret is favoured, but is restricted in a direction opposite to the direction of movement and at right angles thereto. Thus, a comparatively more homogeneous strip of moulding material can be obtained, which, as compared with the known case, can be detached in a simpler manner from the insulating disks.

According to another advantageous embodiment of the invention, the injection nozzle has a slot length which is larger than the distance between two adjacent moulding ducts. The filling time and the hold-on pressure time are thus still further increased so that the quality of the insulating disks and their adherence to the inner conductor are further improved.

The separating member is advantageously in the form of a roller or comprises a rotating belt, the axes of rotation extending parallel to the longitudinal axis of the turret. With the use of a separating member of this type, the strip of moulding material can be detached, for example by tearing of the strip in a simple manner from the insulating disks, which are still held in the mold cavities of the turret. For this purpose, the separation member may efficaciously comprise pairwise equal transport elements operated in opposite directions of rotation.

BRIEF DESCRIPTION OF THE DRAWING

The drawing shows an embodiment of the invention. In the drawing.

DESCRIPTION OF THE PREFERRED EMBODIMENTS

Figure 1:
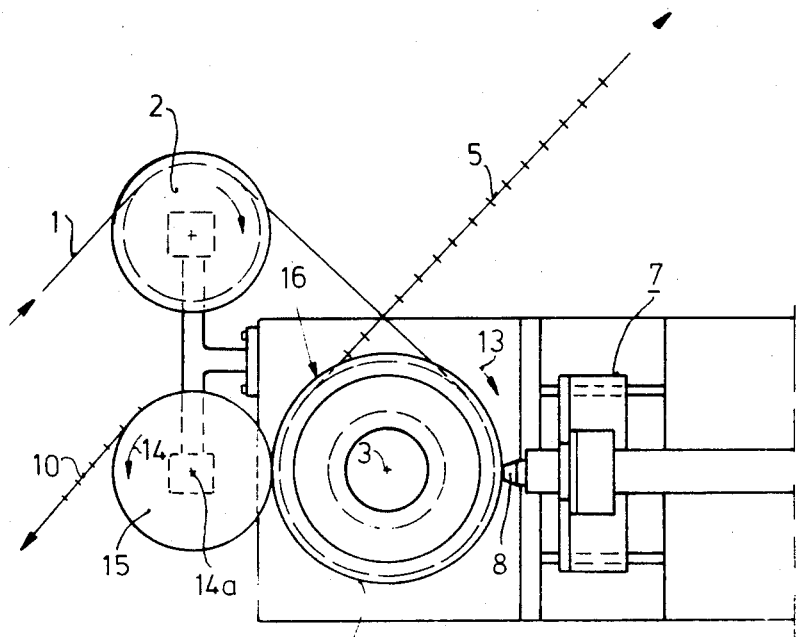
FIG. 1 shows a device according to the invention having a roller-shaper separating member.
Figures 2A, 2B:
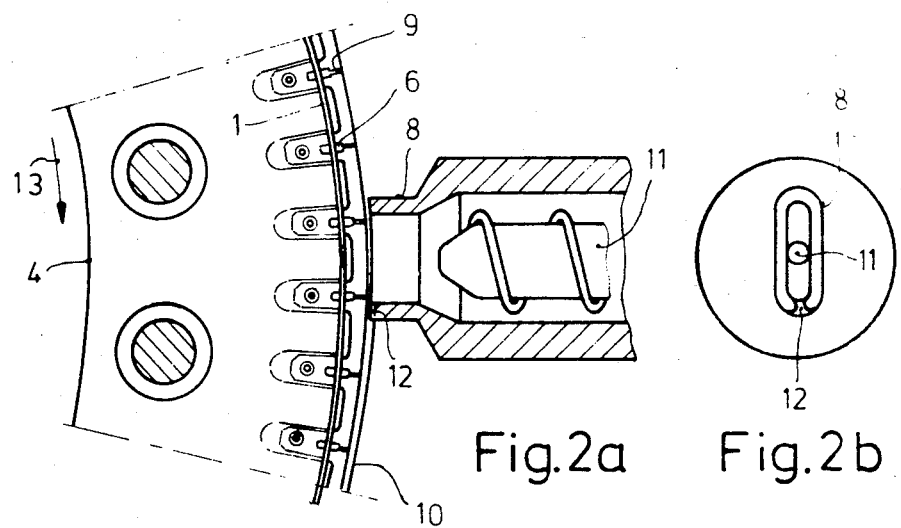
FIG. 2a shows a part of the turret with a nozzle head engaging its outer sheath.
FIG. 2b is the front elevation of the nozzle head.

In the device shown in FIG. 1, the inner conductor 1 of the high-frequency coaxial cable is fed through a deflection disk 2 to the turret 4 rotatable about its axis 3, this conductor being enclosed within the turret and being journalled so that it passes through the centres of the cavities 6 present in the tool carrier 4 for forming the insulating disks 5, as is shown in FIG. 2a. A stationary extruder 7 plastifies the thermoplastic insulating material (moulding material) and expels it continuously through the injection nozzle 8 against the outer surface of the rotating tool carrier 4. As soon as the moulding ducts 9 extending radially outwardly from the likewise radially arranged mold cavities 6 pass the nozzle 8, a part of the extruded moulding material penetrates into the mold cavities 6. An excess of melt flows into the gap between the nozzle end face and the outer surface of the rotating tool carrier 4, and forms thereon a continuous strip 10 of the extruded material (film of moulding material), which serves as a lubricating film for the injection nozzle 8 seated elastically on the tool carrier 4 and interconnects the discrete sprues of the isolating disks 5.

As is shown in FIGS. 2a and 2b, the injection nozzle 8 is in the form of a slot which slot is lengthwise along the circumferential direction of the turret 4. The slot length is chosen so that two moulding ducts 9 can be utilized simultaneously and completely by the injection nozzle 8. Thus, each moulding duct is subjected to the moulding pressure built up by the screw 11 in the extruder cylinder for a considerably longer time than in the device according to the prior art so that there remains sufficient time for filling the forming nests 6 and for the holding pressure step even at a comparatively high angular speed of the turret 4.

The injection nozzle 8 has at its lower end a slot-shaped recess 12, which serves for shaping the strip 10 (film of moulding material). This recess 12 favours the spreading of the film 10 of moulding material in the direction of movement 13 of the turret 4. But, it restricts this formation in a direction opposite to the direction of movement and at right angles thereto on the surface of the turret 4. As a result, a comparatively homogeneous film 10 of moulding material can be obtained, which can be readily detached. This is also favoured by a concave form of the end face of the injection nozzle 8, the radius of which is adapted to that of the tool carrier 4.

According to the invention, the film 10 of a moulding material is transferred in a tangential direction approximately the position of the tool carrier 4 to a transport system located opposite to the extruder position and, rotating synchronously with the tool carrier 4 in the direction of the arrow 14 and serving as a separating device 15, and is then torn off from the insulating disks 5 still firmly enclosed by the cavities 6.

Due to the fact that the insulating disks 5 are still hermetically enclosed in the cavities 6 during the process, it is quite unimportant if due to a comparatively high speed of rotation of the tool surface and to the reduction of the cooling time connected therewith that the extruded material which is in molten form in the cavities 6 has not yet fully solidified. During and after the step of opening the mold cavities 6 at the area 16 in FIG. 1, the inner conductor 1 carrying the insulating disks 5 leaves the tool carrier 4 tangentially without the insulating disks 5 being subjected, until they are sufficiently cooled, even in an accelerated manner, to any force, which could lead to a deflection of the isolating disks 5 and hence to a deterioration of the quality of the cable.

The transport system acting as a separating device 14 may take, for example, the form of a roller or of a rotating transport belt, the axis of rotation on which 14a extends parallel to the axis 3 of the turret 4. The separating device 15 may alternatively comprise, however, a pair of equal transport elements, for example rollers, while transporting the film 10 of moulding material rotate in opposite directions and thus tear the film 10 of moulding material off the insulating disks 5. As a matter of fact, the film 10 of moulding material may also be separated from the insulating disks 5 in a different manner, for example by suitably arranged cutting knives.

What is claimed is:

1. A device for injection molding insulating discs onto the inner conductor of a high-frequency coaxial cable comprising a turret rotatable about its axis and at the circumference of which are located radially arranged mold cavities provided with radially arranged molding ducts extending outwardly from said circumference forming said insulating discs, means for moving said conductor through the centers of said mold cavities, means for opening and closing said mold cavities, injection means for supplying molding material to said cavities comprising an injection nozzle directed toward the circumference of said turret and means for separating the molding material formed during the molding process on the circumference of said turret from said insulating discs, characterized in that the face of the injection nozzle facing the circumference of the turret is provided with an orifice which orifice is an oval shaped slot, the longitudinal direction of which slot extends along the circumferential direction of said turret and the longitudinal dimension of which slot is larger than the diameter of the molding ducts and the means for separating the film of molding material formed on the circumference of said turret from the insulating discs is so located in relation to the turret that it separates the film of molding material from the insulating discs in an area in which the mold cavities are closed.

2. A device as claimed in claim 1, characterized in that the face of the injection nozzle facing the circumference of the turret is provided with a recess in such a manner that the spreading of the film of moulding material in the direction of movement of the turret is favoured, but is restricted in the direction opposite to the direction of said movement and at right angles thereto.

3. A device as claimed in claim 1, characterized in that the injection nozzle has a slot length which is larger than the distance between two adjacent moulding ducts.

4. A device as claimed in claim 1, characterized in that the end face of the injection nozzle is concave and is adapted to the radius of the tool carrier.

5. A device as claimed in claim 1, characterized in that the separating means is a roller or is a rotating belt, the axis of rotation extending parallel to the axis of the turret.

6. The device claimed in claim 1 wherein the separating means comprises a pair of identical transport elements moving in opposite directions.

* * * * *